United States Patent
Chmielewski et al.

[11] 3,720,275
[45] March 13, 1973

[54] DEVICE FOR READING PENDULUM-CAM SCALES BEAM POSITIONS AND FOR PLACING AND REMOVING WEIGHTS

[76] Inventors: Andrzej Chmielewski, ul. Msciwoja 6, Gdansk-Oliwa; Eligiusz Czerniak, ul. Mickiewicza 1/3m1, Gdansk-Wrzeszcz; Tadeusz Kibort, ul. Piastowska 100d m69, Gdansk-Oliwa, all of Poland

[22] Filed: Aug. 4, 1971

[21] Appl. No.: 168,884

Related U.S. Application Data

[63] Continuation-in-part of Ser. No. 784,356, Dec. 23, 1968, abandoned.

[52] U.S. Cl. .................. 177/3, 177/178, 177/237, 177/DIG. 3
[51] Int. Cl. ....... G01g 1/28, G01g 23/36, G01g 23/37
[58] Field of Search ........ 177/DIG. 1, DIG. 3, 3, 178, 177/237

[56] References Cited

UNITED STATES PATENTS

| | | | |
|---|---|---|---|
| 2,662,762 | 12/1953 | Meinig | 177/237 UX |
| 2,680,012 | 6/1954 | Bozoian | 177/DIG. 1 |
| 3,039,686 | 6/1962 | Bell et al. | 177/3 UX |
| 3,044,691 | 7/1962 | Allen | 177/DIG. 1 |
| 3,055,444 | 9/1962 | Chyo | 177/237 UX |
| 3,061,026 | 10/1962 | Hecox et al. | 177/DIG. 1 |
| 3,134,448 | 5/1964 | Chyo | 177/237 UX |
| 3,163,247 | 12/1964 | Bell et al. | 177/3 |
| 3,213,954 | 10/1965 | Meyer et al. | 177/237 UX |
| 3,439,760 | 4/1969 | Allen | 177/3 |
| 3,193,032 | 7/1965 | Martin | 177/178 |

FOREIGN PATENTS OR APPLICATIONS

| | | | |
|---|---|---|---|
| 169,445 | 11/1959 | Sweden | 177/DIG. 3 |
| 355,963 | 9/1961 | Switzerland | 177/3 |
| 1,231,229 | 4/1960 | France | 177/DIG. 1 |

*Primary Examiner*—Robert S. Ward, Jr.
*Attorney*—Irvin A. Lavine

[57] ABSTRACT

A pendulum scale has a scale beam carrying an optical microscale and a sample pan assembly including plural weight hangers. Weights are provided, and are carried by either the weight hangers or weight retaining elements. A light source illuminates the optical microscale, and portions of the light are received by photocells, the signals from which are representative of the scale beam position; these signals are supplied to a decoder which controls which weights are carried by the weight hangers and which weights are carried by the retaining elements. Preferably, a first lesser sensitive scale beam and a second greater sensitive scale beam are cumulatively engaged with the sample pan assembly. A digital read-out device is connected with the decoder to provide a read-out of the weight of a sample placed in the sample pan of the sample pan assembly.

16 Claims, 11 Drawing Figures

DEVICE FOR READING PENDULUM-CAM SCALES BEAM POSITIONS AND FOR PLACING AND REMOVING WEIGHTS

This application is a continuation-in-part of application Ser. No. 784,356, now abandoned.

In known balance beam scales, there are employed mechanical means which are manually controlled, and in order to perform the weighing over the entire measuring range, the balance beam must be equilibrated with weights having a mass which is approximately the same as the mass being weighed, by manual controlling a cam mechanism. This was necessary due to the very small deflection angle to the analytical balance beam of about 2°. Hence, the deflection range of the pointer is not wide and the weighing result obtained by reading the image of a dashed microscale on a ground glass is not reliable.

There are also known commercial scales or those of little accuracy provided with digital reading and encoded tables provided for reading the deflection range. Such scales operate in only one measuring range, without any possibility of applying to them a self-acting system of multirange measurements with an accuracy corresponding to that of analytical scales.

As a typical example of a conventional system for handling the calibrated weights, that specified in U. S. Pat. No. 3,055,444 may be noted, in which on a common shaft a cam for engaging the beam and a cam for arresting the calibrated weights handling mechanism are arranged.

There is also known a balance according to U. S. Pat. No. 3,134,448 with a cam-and-link mechanism for handling the calibrated weights, in which each lever of a group is operated by means of electromagnets. The circuits of these arrangements are fed through a rotary switch and the whole is coupled with a summation mechanism of the calibrated weights being placed, as in conventional balances. This construction cannot be used for analytical balances owing to the detrimental effect of variable electromagnetic fields acting permanently, and owing to violent movements of the levers operated by the electromagnets.

In U. S. Pat. No. 2,680,012, a mechanism is provided with a separate cam for every one of a plurality of calibrated weights. These cams are fitted on shafts driven by a servo-counter. Another variation of the mechanism is a chain suspended on the balance beam, the loading of which is controlled by means of a shaft, also with a servo-counter. This device is characterized by a complicated structure, including a large number of cams, gear wheels, clutches, and pawls, which may affect vibrations of the system. The fact that this device may operate only with an engaged balance beam showing deflection range prevents it from being used for balances of high accuracy.

U. S. Pat. No. 3,061,026 indicates the position of the balance beam digitally by means of a code plotted on a plate fastened to the balance beam and of an optical system transmitting the code position onto electric outputs. This arrangement is however not applicable for analytical balances due to the rectilinear arrangement of the code, causing a shift of the fields of said system in relation to a balance beam moving along a circular arc. Locating of the extreme states in an additional column does not coordinate the reading values with limiting signal and so it cannot be used to read the position when beams of different sensitivities co-operate.

An object of the present invention is to provide a balance (or scale) of the pivoted balance beam type of great accuracy and sensitivity, and capable of automatic weighing.

A further object is to provide such a scale or balance wherein the handling of weights is done automatically in response to scale beam position as read by optical means with electric signal output.

Another object is the provision of a scale which can weigh a sample in a given time, independent of a human operator.

A still further object is the provision of a balance or scale having plural beams of differing sensitivities, and a system for engaging the beams cumulatively.

In the drawings:

FIG. 5 shows a circuit for storing, decoding and displaying the signals from the circuits of FIGS. 4 and 4a.

Before undertaking a detailed description of the present invention apparatus, a general description thereof, with principles of operation, will be given. The weight measuring device comprises a balance beam which, when operational, is supported on a knife edge. The weight on one part of the balance beam is exactly balanced by the weight on the other part of the balance beam, this latter being the weight of part of the balance beam on the other side of the knife edge, plus the weight of all of the removable, calibrated weights which are carried thereon. A sample whose weight is to be determined is placed upon the balance beam on a pan carried by the balance beam at a point remote from the knife edge, thus causing the beam to pivot to an out-of-balance position; the extent of movement of the beam to achieve this position is measured, to thereby provide an indication of the weight of the sample. In the present embodiment, the sample is carried by the balance beam on the same side of the knife edge as are the calibrated weights, and in order to restore the beam to the balance condition, it is necessary to remove selected ones of the calibrated weights.

The sample and all of the calibrated weights are carried by an assembly of a sample pan and a plurality of weight hangars, which assembly is capable of being engaged by a first balance beam which is of relatively low sensitivity, and by a second balance beam, which is of greater sensitivity. In order to determine the weight of the sample the assembly is placed with all of the calibrated weights on the first balance beam, the deflection measured by means of a microscale and reader arrangement, and then selected ones of the calibrated weights are removed from the assembly in accordance with the reading of the microscale. This gives a first, and lesser sensitivity balance reading. Thereafter, the pan is engaged by the second beam and the deflection measured by means of a microscale on the second beam. A combination of the two results provides the measure of the weight of the sample.

Figure 1:
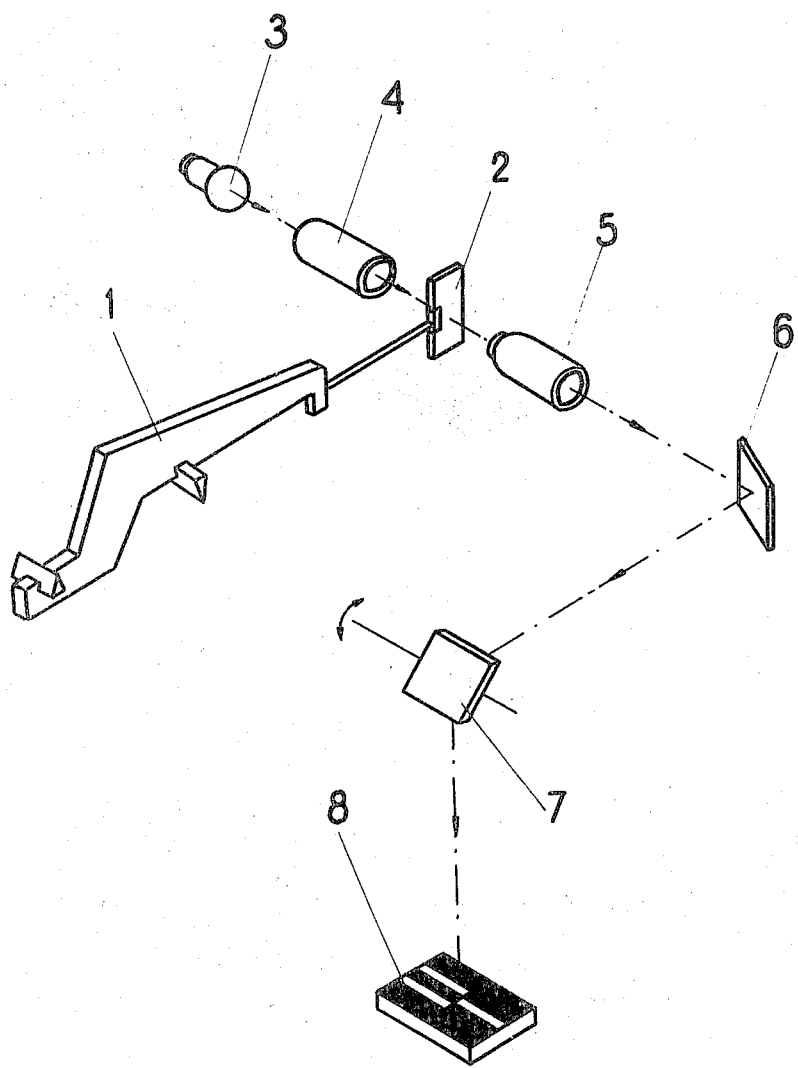
FIG. 1 is a diagrammatic view of a pendulum cam scale beam and optical system.

Referring now to the drawings, there is shown in FIG. 1 a diagrammatic perspective view of a scale beam 1 which has a knife edge 1B intermediate its ends and on which it may be pivoted during a weighing process; one end of the beam 1 carries an optical microscale 2. The other end of the beam 1 has a knife edge 1A for engaging a sample container or pan (not shown) and when a weighing process takes place the deviation of the beam 1 from a datum position is measured by an optical reading system associated with the microscale 2. The reading system has a source of light 3, a condensing lens 4, an objective lens 5, mirrors 6 and 7 and a photoelectric reading unit 8, the arrangement being such that light from the source 3 is projected through the scale 2 to form an image which is magnified by the lens 5, focused and directed by the mirrors 6, 7 to fall upon the reading unit 8.

Figure 2:
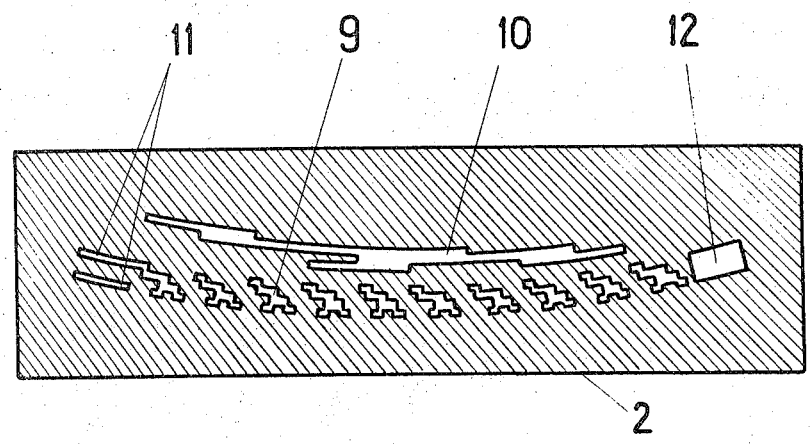
FIG. 2 is a view of the micro-scale forming part of the optical system.

As shown in FIG. 2, the scale 2 has two degrees of light transmittance which are arranged to encode the operating range of the beam 1 in a binary form. The scale 2 has a band of 10 bits 9 each representative of decimal units and a single arcuate bit 10 representative of decimal 10, together with terminal code elements 11, 12 indicative of the limits of the operating range of the balance beam. The arc on which the bits 9, 10 are arranged is centered on the knife edge 1B.

Figure 3:
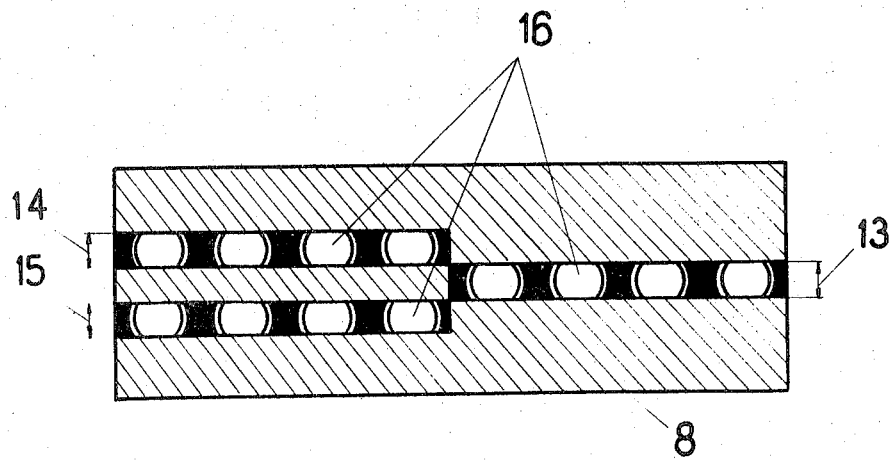
FIG. 3 is a plan view of a photo-electric scale reader.

The reading unit 8, as shown in FIG. 3, has 12 photoelements 16 (16A, 16B, 16C .... 16L) which are located behind a mask containing three slits or interstices 13, 14, 15. The four photoelements 16A, B, C, D which receive light through the slit 13 read information from one of the bits 9 of the code 2, and the photoelements which receive light through the slits 14 and 15 each read information from the bit 10 of the code 2.

It will be recognized that each of the decimal unit bits 9 has essentially the same functional shape as the decimal 10s bit 10, which latter will now be referred to. The bit 10 is made up of a number of generally arcuately extending sections, which are centered, as above noted, on the knife edge 1B, these sections being placed in arcs at four different distances from the knife edge 1B, thereby corresponding to the photoelements 16A, 16B, 16C and 16D. Referring to FIG. 2, the terminal code 12 has adjacent to it, to the left, a first decimal units bit, and no portion of the bit 10 is opposite or inwardly of that particular bit. Inwardly of the second bit 9 is a section of the bit 10, and this is furtherest removed from the knife edge 1B. Should the scale beam 1 come to a position so that the light passes through the second of the bits 9, and the noted section of the bit 10, photocell 16L will receive light. Next is a section opposite the third bit 9, which is on both the outermost arc and a second arc next adjacent to it. Light through that section will fall upon photocells 16K and 16L. Opposite the fourth bit 9 is a section also on the second outermost arc, and light therethrough will illuminate only photocell 16K. For the position of the fith bit 9, light will pass through a section of bit 10 which is on the second and third arcs, and thereby light passing therethrough will fall upon the photocells 16K and 16J. In the sixth position, light will fall upon photocells 16J, 16K and 16L. In the seventh position, light will fall upon photocells 16J and 16L. For the eighth position, light will fall only upon photocell 16J. For the ninth position, light will fall upon photocells 16I and 16J, and for the 10th position, light will fall only upon 16I.

As above indicated, each of the bits 9 is essentially of the same functional shape as the bit 10, and each has the ability to pass light having a specific pattern for illumination of one or more of the photocells 16A, 16B, 16C and 16D, so that decimal units of the scale beam position may be encoded. Should the scale beam 1 be deflected to the position so that the terminal code 12 is illuminated, then all four of the photocells of the active group will receive light, whereas if the scale beam 1 is moved to position such that the terminal code element 11 receives illumination, then the two end photocells 16A and 16D of the four photocell group will receive light.

Figure 4:
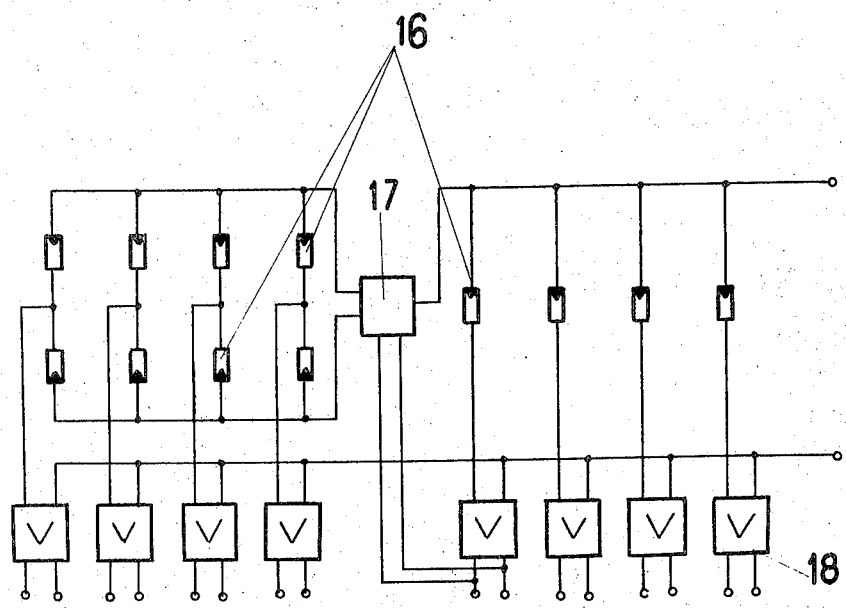
FIG. 4 is an electric circuit including photo-cells and amplifiers.

Power to the photoelements 16, as shown in FIG. 4, is supplied from a d.c. source by an upper bus bar 37 and a lower bus bar 38 which acts as the "common" line. The four photoelements 16A, 16B, 16C, 16D are respectively connected between the bus bar 37 and one input of four differential amplifiers 18, the other inputs of which are connected to the common line 38. The four photoelements 16E, 16F, 16G, 16H each has one terminal respectively connected in parallel with the corresponding terminal of the four photoelements 16I, 16J, 16K, 16L, these terminals each being respectively connected to one input of each of a further set of four differential amplifier 18, the other inputs of which are connected to the common line 38. The other terminals of the photoelements 16E, 16F, 16G, 16H are fed from an upper branch bus bar 37A, the other terminals of photoelements 16I, 16J, 16K, 16L are fed from branch 37B being alternatively connectable to the bus bar 37 by a switch 17; switch 17 is controlled by the amplifier 18 fed from the photoelement 16A.

The switch 17 is normally arranged to supply power to the bus bar 37B, but when in the decade of unit bits the value "nine" is reached, the photoelement 16A is energized and actuates the switch 17, which is thereby caused to supply power to the bus bar 37A to ensure continuity of decimal 10s bit 10 being read until in the opposite decimal unit bit 9 the value "nine" is read. Such dependence of the read out of the superior decimal 10s 10 from the inferior decimal tens 9 safeguards the correctness of the read out within the range and at the limits of particular decimal 10s thus excluding an erroneous read out, e.g. "19" or "zero" instead of "10" at the boundary between the first and second decimal tens bits 9.

Figure 4A:
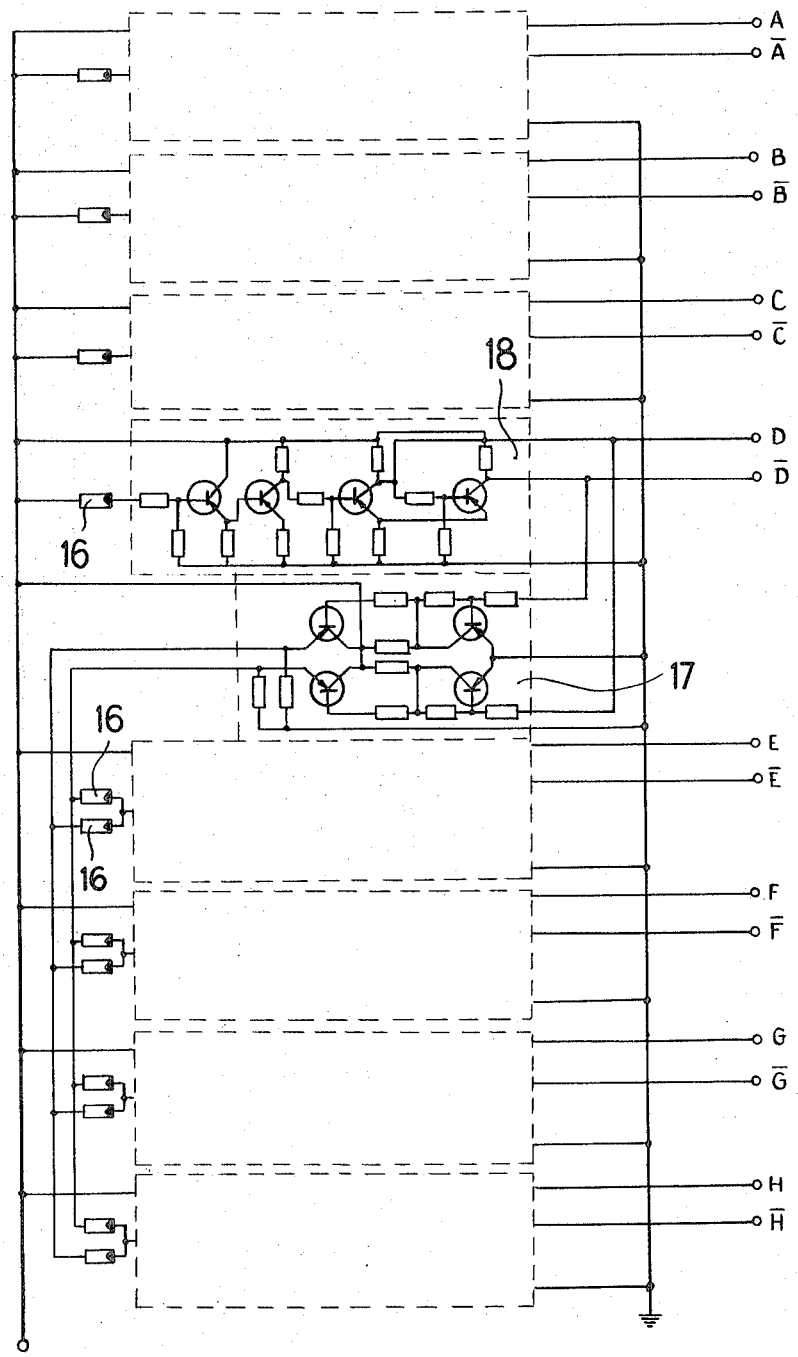
FIG. 4a is similar to FIG. 4, showing an amplifier and a switch in detail.

Referring now to FIG. 4a, an exemplary one of the amplifiers 18 is shown in detail, it being understood that the other amplifiers 18 are of identical construction. Also in FIG. 4a there is shown the switch 17, together with its connections to the output of the amplifier 18 of the photoelement 16A.

Figure 5:
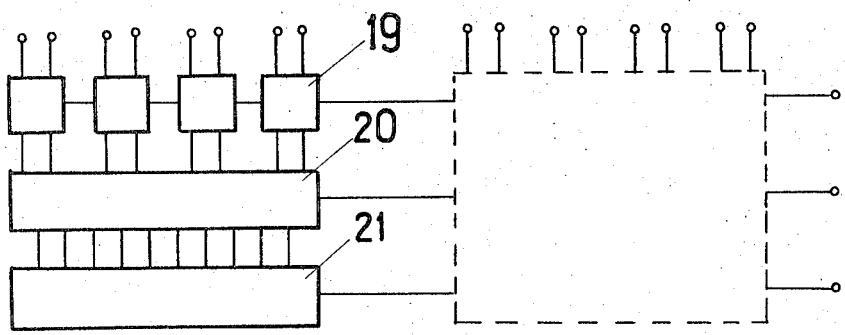

In order to output the information received from the microscale 2 via the photoelements 16, each of the amplifiers 18 feeds a bistable flip-flop 19 for storage purposes, and the bistable flip-flop 19 operates a binary-to-decimal decoder 20, the outputs from which are displayed visually on decimal indicator display 21. As is schematically illustrated in FIG. 5, a decoder 20 is provided for each decimal decade.

Figure 5A:
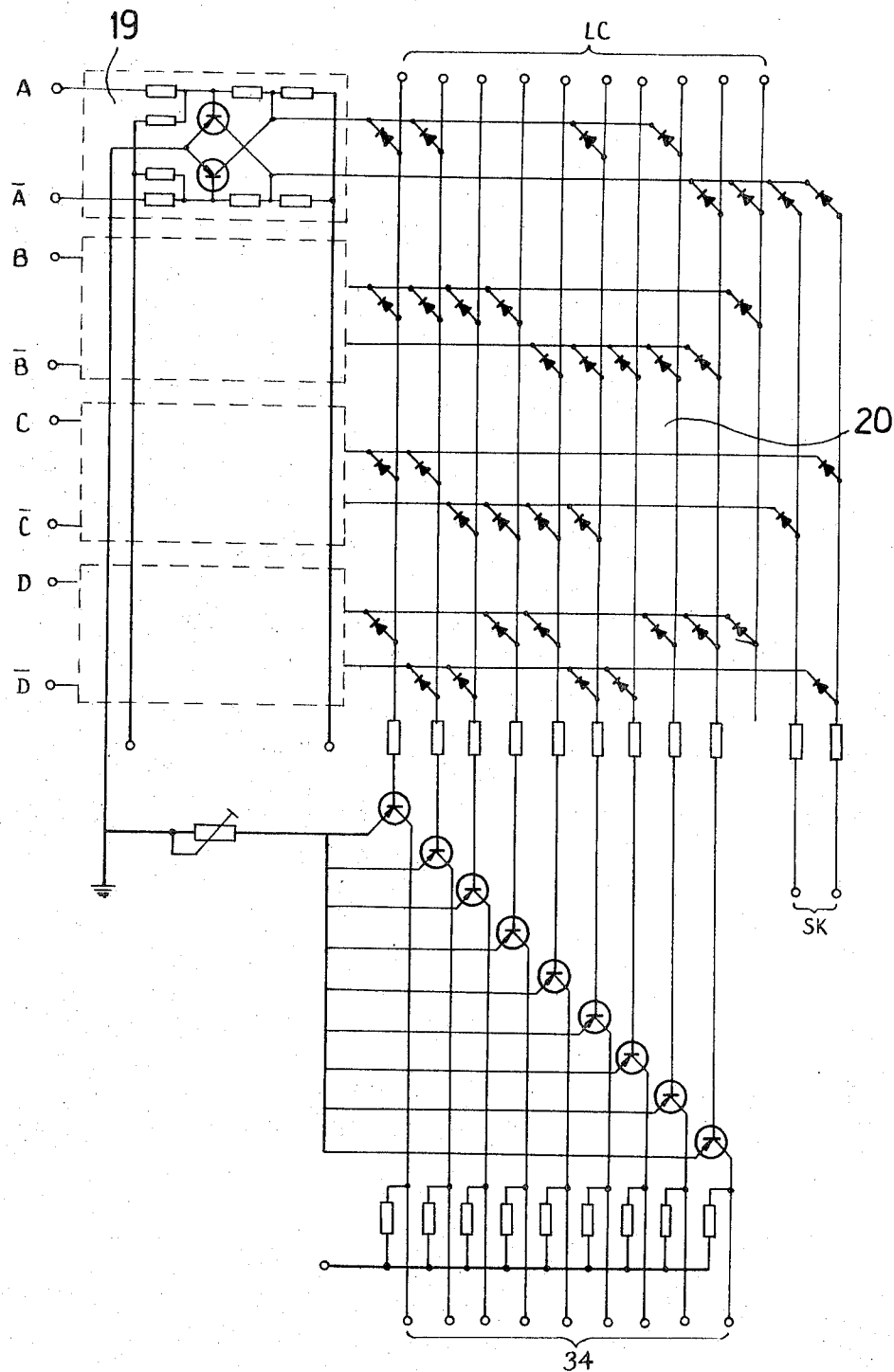
FIG. 5a shows details of portions of the circuit of FIG. 5.
Figure 5B:
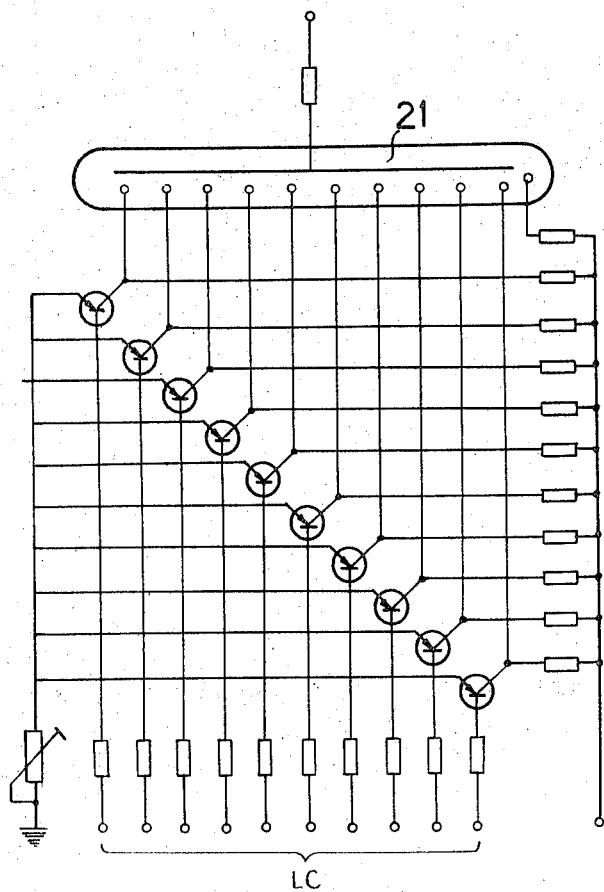
FIG. 5b shows details of other portions of the circuit of FIG. 5.

Referring now to FIG. 5a, there is shown exemplary bistable flip-flop 19 of known construction, the others being identical thereto. The flip-flops 19 are each controlled from the outputs from one of the amplifiers 18, shown in FIGS. 4 and 4a. There is also shown in FIG. 5a an exemplary decoder 20 of one reading decade, which is provided for the reading of four bits of information, which, as will be understood, originate with the position of the scale beam 1 as indicated by the microscale 2 and photoelements 16. The four flip-flops 19 as shown in FIG. 5a constitute a signal storage system. The outputs from the decoder 20 to the digital indicator display 21 are collectively marked "LC." In addition, there is shown the outputs 34 which are connected to the electronic control system 30 of the weight handling mechanism (hereinafter referred to). In particular, the terminals 34 are connected with the terminals 34 of the weight decoder 33, referred to in connection with FIG. 7 hereinbelow, and the outputs designated "SK" are provided for controlling the weighing process and for correction in connection with beams of different sensitivities.

Figure 6:
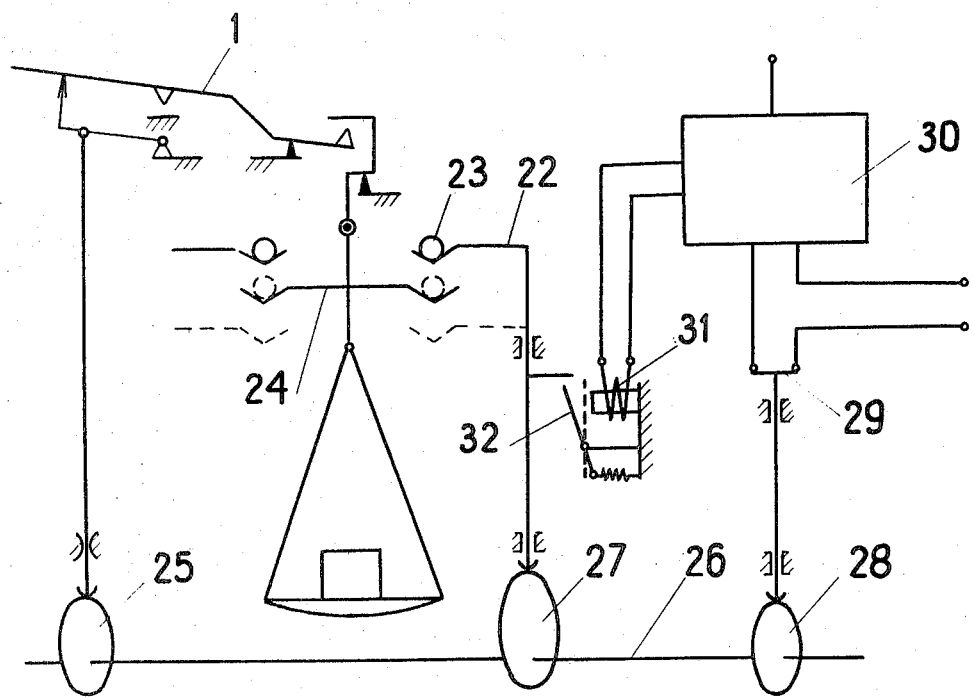
FIG. 6 is a schematic showing, with parts removed, of a scale beam and weight control apparatus and circuit.

Referring now to FIG. 6, there is schematically shown the apparatus for placing and removing weights. A shaft 26 is rotated by a motor (not shown) and carries thereon cams 25, 27 and 28: this shaft functionally connects the beam 1, the weight retaining member 22 for the weights 23, and the electronic control system 30. Cam 25 is engaged by a push rod 39, which is lowered when shaft 26 rotates, to thereby lower beam 1 onto its knife-edge 1B. When this occurs, the knife-edge 1A engages and lifts the sample container or weight pan assembly 40, which contains a sample; it is the weight of this sample which is to be determined.

The pan assembly 40 has a plurality of hangers 24, only one of which is shown in FIG. 6 for purposes of clarity. Each of the hangers 24 receives a calibrated weight 23. Each weight 23 is normally held in a lifting retaining member 22 which is capable of raising its weight 23 to a position where the particular weight 23 is out of reach of the hanger 24. Rotation of shaft 26 will cause cam 27 to rotate with it, to thereby lower the retaining member 22 and its associated weight 23.

However, each of the retaining members 22 is provided with an abutment 22A, engageable by a locking element 32 which is spring-urged to the full line position shown, but which may be moved to the dotted line position under the action of an electromagnet 31. Hence, when the electromagnet 31 is de-energized, upon rotation of shaft 26 the locking element 32 will engage with abutment 22A, thereby preventing the retaining member 22 from lowering the weight 23 to the hanger 24, while energization of the electromagnet 31 will retract the locking element 32, thereby permitting the retaining member 22 to be lowered upon rotation of shaft 26, to thereby place the weight 23 on hanger 24.

Consequently, after first lifting all of the weights 23 from the hangers 24, it is possible to prevent selected ones of the weights from being replaced on the hangers 24 by the de-energization of selected ones of the electromagnets 31. Electromagnets 31 are controlled from a control unit 30, to be described hereinbelow.

The aforementioned cam 28 controls an on-off switch 29, which switch controls the control unit 30.

Figure 7:
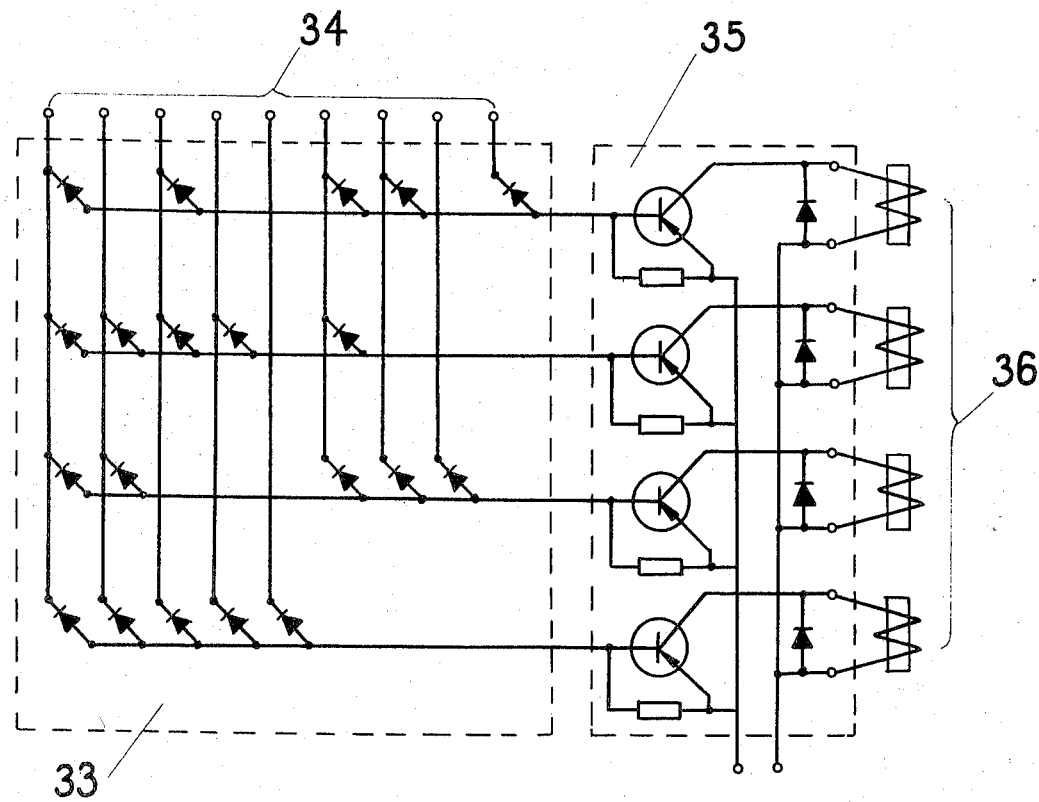
FIG. 7 is a detail showing of a circuit of FIG. 6.

Referring now to FIG. 7, the electronic control system 30 will now be described. There is shown in detail one part of the control system 30, this being a diode matrix 33 of known construction having the input terminals 34 thereof connected, as indicated above in connection with FIG. 5a, to the output of the decoder 20. When the electrical signals from decoder 20 are fed to the matrix 33, an encoded signal is produced and is transmitted via the transistorized amplifiers 35 to selected one or ones of the four electromagnets 31. The previously mentioned weights 23 will therefore be seen to be four in number, and to be controlled or lifted by four retaining members 22. The weights 23 are respectively 1, 1, 2 and 5 units, this selection permitting the selection of any weight units between zero and nine units.

In operation, when the motor causes the shaft 26 to be rotated, the first action will be caused by the cam 27. It will be understood that while one cam 27 has been shown in FIG. 6, there are in fact eight such cams of identical profile and fixed in identical position so that they can form one common cam; consequently there are eight retainers or lifters 22 and eight weights 23. As above noted, one group of four weights will be 1, 1, 2 and 5 units, and a second group of four weights will be 10, 10, 20 and 50 units. After engaging the beam 1 with weight pan assembly 40, the shaft 26 is arrested with the cams 27 in position corresponding to the lower position of lifting retaining members 22, the contacts of switch 29 are closed, and electromagnets 31 are supplied only under the control of the matrix of weight decoder 33. The position of the beam 1 will be sensed by the apparatus including the microscale 2 and the photoelements 16, the light signals received by photoelements 16 being converted into electrical signals, which are amplified by the amplifiers 18 and transmitted by the bistable flip-flops 19 and decoder 20 to the digital indicator display 21, and, simultaneously, will be transmitted to the diode matrices of the control unit 30. This will cause certain ones of the electromagnets to be energized, to thereby hold the corresponding weights 23 away from the pan assembly 40.

Figure 8:
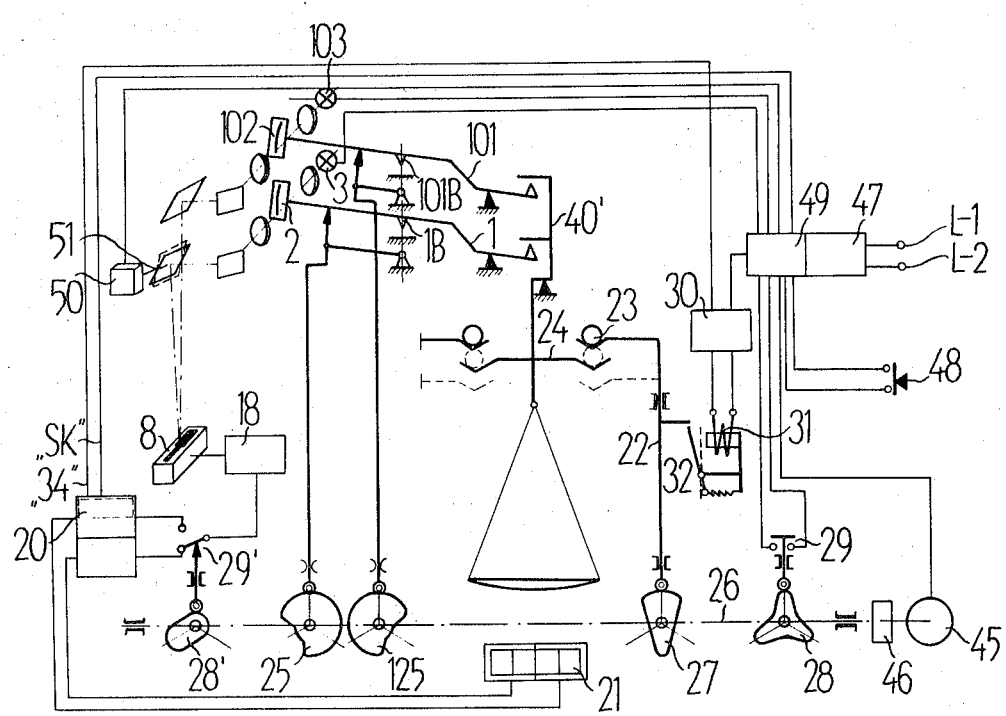
FIG. 8 is a schematic showing, similar to FIG. 6, of a system with plural scale beams.

Referring now to FIG. 8, there is disclosed a schematic diagram of a scale in accordance with the present invention, generally similar to that shown in FIG. 6, there being shown in FIG. 8 the scale beam 1 with knife edge 1B, control of which is by means of cam 25 on shaft 26. The beam 1 carries the micro-scale 2, and there is shown the cooperating optical system parts including the light source 3 and the photoelectric reading unit 8.

The shaft 26 is caused to rotate by the motor 45, through a suitable gear box 46. Energy is supplied to the motor 45 through mains L-1 and L-2 across the junction box 47 and the balance control block 49 containing outputs to contacts of manual switch 48 and switch 29 maintaining the movement of motor 45 initiated by switch 48 and thus of the common shaft 26 with its plurality of cams. The opening of switch 29 by cam 28 causes the motor 45 to stop and thus also the shaft 26, thereby breaking the supply of energy to electromagnets 31 that control the locking elements 32, the supply of energy to light source 3 and also the actuation of a timing unit in the balance control block 49, which timing unit causes, after a lapse of a predetermined time period for weighing by beam 1, an automatic actuation of motor 45. Essentially there is no significant distinction between the operation described in connection with FIG. 8, thus far, and the operation hereinabove described with reference to FIG. 6.

Also shown in FIG. 8 is a second scale beam 101, having a knife edge 101B. The pan assembly 40' has provision for engagement by the beam 101, and the beam 101 is provided with a micro-scale 102, with attendant optical system including the light source 103. The beam 101 is of higher sensitivity than the beam 1, and will, due to associated apparatus to be described, proceed with a weighing operation upon conclusion of the weighing operation performed by the scale beam 1. The repeated automatic actuation of motor 45 from the timing unit causes a further revolution of shaft 26 with its cams. The cam 25 causes the disengagement of beam 1, the cam 28 closes switch 29, which takes over the supply of energy to motor 45 and connects with junction box 47 to electromagnets 31, the actuation of which depends on controlling signals from matrices of weight decoders 33. To the inputs 34 of decoder 33 is supplied the result of weighing on beam 1; the cams 27 cause a temporary simultaneous displacement into the upper position of all lifting-retaining members 22, the cam 125 causes engagement for weighing of beam 101, and cam 28 switches by means of switch 29 the common assembly of amplifiers 18 to the decoders 20, provided for the read out of the position of beam 101.

Hence, upon initiation of the push button 48, the motor 45 will be energized, so as to rotate shaft 26 and cam 25, to thereby begin the weighing operation with scale beam 1, all as discussed hereinabove in accordance with the showing including FIG. 6. At the conclusion of that weighing operation, the values of the deflection range of beam 1, can be read by means of signals from decoders (see FIG. 5a) which signals are directed to outputs denoted by "LC" to digital indicators 21 and to outputs 34 for controlling of the weight decoders 33, and if on the pan a mass has been placed which exceeds the capacity of the balance, the beam 1 assumes the position emitting the extreme state 11, the signal thus distinguished by decoder 20 will appear on one of the outputs denoted "SK" connected with balance control system 49 and will cause a reversal of direction of motor 45 to be subsequently actuated, which will cause the automatic disengagement of the balance. Cam 125 will cause the knife edge 101B of scale beam 101 to be lowered, so that scale beam 101 is now in operative engagement with pan assembly 40', and the position of scale beam 101 will be sensed by reading unit 8, it being understood that energy to light source 3 will be interrupted and energy will now be supplied, instead, to source 103.

With the beam 101 engaged for final weighing, it can assume a position corresponding to its deflection measuring range, causing the indication of successive decades of results, or it can assume the extreme position and thereby cause illumination of terminal code element 12 and causing a discrimination of the second of the outputs of decoder 20 denoted by "SK," which is connected with balance control block 49, causing a reversal of direction of the motor 45 when it is subsequently actuated, and also through connection with correction system 50 change the inclination angle of mirror 51 so that the read out of the value of repeated weighing on beam 1 is by one elementary mass unit smaller and would cause a repeated switching over of the balance for weighing on beam 101 the removal of weight mass 23 being summarily smaller by this unit. For better cooperation of beam 1 with beam 101 the read out of indications of beam 1 has been purposely displaced toward the plus value with a view that the error or read out of elementary boundary values be always in "plus" (unidirectional) and corrected in the manner described above.

An example of the application of the invention disclosed in FIG. 8 containing two cooperating beams is as follows. The measuring range of beam 101 is equal to one one-hundredths of the measuring range of beam 1. Both beams together with two decades of weights 23 provide in effect the total measuring range of the balance equalling 10,000 units. A widening of the measuring range is effected by the application of an additional beam with appropriately smaller or greater sensitivity, or by the application of a spring for preliminary weighing cooperating with the beam with smaller sensitivity, the result of preliminary weighing being read out in the manner as described above by means of this beam and a microscale. A widening of the measuring range can also be made by the application of the microscale according to the invention, but with a greater number of elementary divisions, e.g. 1,000.

We claim:
1. In a scale,
a balance beam having a sample pan and plural weight hanger means thereon,
a plurality of weights,
optical scale means carried by said balance beam and movable therewith for encoding the position of said balance beam,
light source means projecting light through said optical scale means,
plural photocell means for receiving light passed through said optical scale means and for generating a signal representative of the position of said balance beam,
a plurality of weight retaining means each having a first position in which a said weight is supported and a second position in which a said weight is carried by a said weight hanger,
and means receiving signals from said photocell means for controlling the position of said weight retaining means.

2. The scale of claim 1, and further including a shaft having plural cams thereon, each said weight retaining means engaging and being movable by a said cam, said means for controlling the position of said weight retaining means comprising a plurality of locking elements one for each said weight retaining means, said means for controlling the position of said weight retaining means comprising means for controlling the position to each said locking element.

3. The scale of claim 2, wherein said last mentioned means comprises an electromagnet for each locking element.

4. The scale of claim 3, wherein said photocell means comprises a group of four photocells, an amplifier connected with the output of each photocell, a flip-flop connected to the output of each amplifier, and decoder means having the input thereof connected to the output of said flip-flops, a matrix having its input connected to the output of said decoder and its output connected to said electromagnets.

5. The scale of claim 4, and digital indicator display means having the input thereof connected to the output of said decoder.

6. The scale of claim 1, said optical scale means having a light transmitting bit comprising arc-shaped sections centered on the pivot point of the balance beam, with at least one said section being at a different distance from said pivot point than another of said sections.

7. The sale of claim 6, wherein there are a series of such bits of the same size and shape positioned in an arc-centered on said pivot point.

8. The scale of claim 7, said arcuate path at each end thereof further having terminal position light transmitting bits each of which permits the transmission of light in a pattern different from that of any other bit in said arcuate path.

9. The scale of claim 7, and a further arcuate light transmitting bit extending adjacent to said series of bits and centered on said pivot point, said further bit having arc-shaped sections at different distances from said pivot point.

10. The scale of claim 9, wherein there is a first bank of photocell means for receiving light from said bits in said arcuate path and second and third banks of photocells for receiving light from said further bit, the output of each said photocell of said second and third banks connected in parallel to an amplifier, the output of each photocell of said first bank connected to an amplifier, and switch means for controlling the supply of current to either the second or third bank of photocells responsive to a signal from an amplifier connected to a photocell of said first bank.

11. The scale of claim 6, wherein said sections are at four different distances from said pivot point, and wherein said plural photocell means comprises a photocell for receiving light from each said section located at the same distance from said pivot point.

12. The scale of claim 1, said optical scale means comprising bits having sections of different colors, said photocell means being color responsive.

13. The scale of claim 1, further including a shaft having a switch cam, weight retaining means cam means, and a balance beam engaging means cam, said position controlling means comprising means for rotating said shaft.

14. The scale of claim 13, wherein said cam means comprises plural cams of identical profile fixed on said shaft in identical positions.

15. The scale of claim 14, said cam means comprising a single cam.

16. The scale of claim 13, and switch means controlling said shaft rotating means, and means operatively connecting said switch means and said switch cam.

* * * * *